Figure 1:
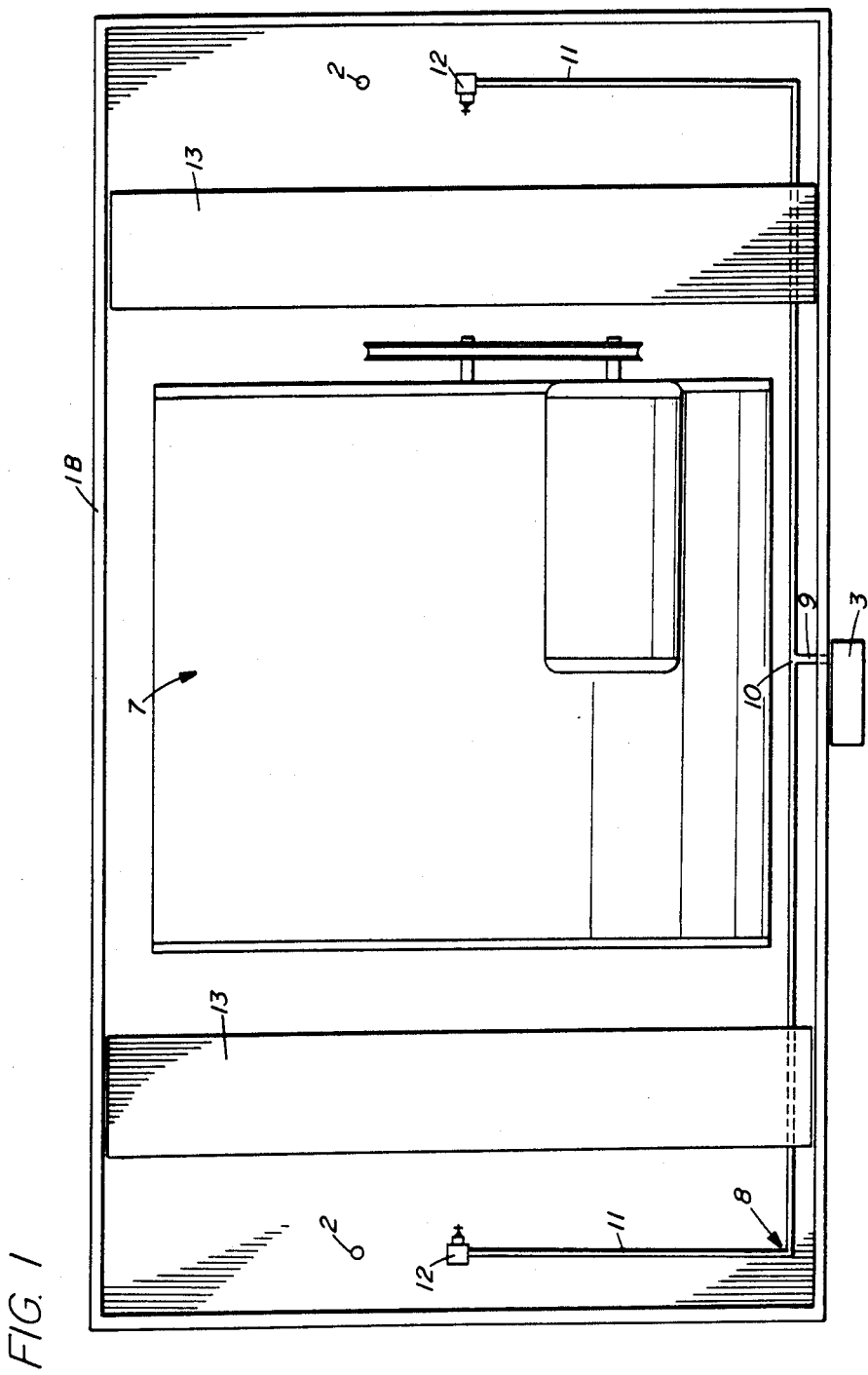

United States Patent [19]

Welch

[11] Patent Number: 4,968,457

[45] Date of Patent: Nov. 6, 1990

[54] NON-CIRCULATING WATER SYSTEM FOR EVAPORATIVE COOLERS

[76] Inventor: Gary M. Welch, 59 Shoreline Dr. SH, Malakoff, Tex. 75148

[21] Appl. No.: 407,665

[22] Filed: Sep. 15, 1989

[51] Int. Cl.$^5$ ............................................. B01F 3/04
[52] U.S. Cl. .................................. 261/39.1; 261/98; 261/100; 261/DIG. 46; 261/DIG. 74; 261/66; 62/171; 236/44 A; 236/44 C
[58] Field of Search ............ 236/44 A, 44 C; 62/171; 261/66, DIG. 74, DIG. 46, 100, 39.1, 97, 98

[56] References Cited

U.S. PATENT DOCUMENTS

| | | | |
|---|---|---|---|
| 1,508,234 | 9/1924 | Morrison | 261/DIG. 74 |
| 2,075,314 | 3/1937 | Suppes | 236/44 C |
| 2,137,996 | 11/1938 | Crawford | 62/171 |
| 2,184,613 | 12/1939 | Evleth | 55/227 |
| 2,342,841 | 2/1944 | Carraway | 62/171 |
| 3,171,401 | 3/1965 | McDuffee | 261/DIG. 34 |
| 3,855,371 | 12/1974 | Morrow et al. | 261/100 |
| 4,354,985 | 10/1982 | Johnson | 261/100 |
| 4,379,712 | 4/1983 | Sperr, Jr. et al. | 261/26 |
| 4,499,031 | 2/1985 | Sexton et al. | 62/176.4 |
| 4,576,013 | 3/1986 | Sperr, Jr. et al. | 62/171 |

Primary Examiner—Tim Miles
Attorney, Agent, or Firm—Pravel, Gambrell, Hewitt, Kimball & Krieger

[57] ABSTRACT

A non-circulating water system for use in evaporative coolers which incorporates a timing means in conjunction with a valve means, to control the flow of water to the pads. It applies measured amounts of water to the pad and allows measured amounts of time between applications so that most of the water is used in the evaporation process and minimal amounts of water are discharged though a drain. Domestic water line pressure is used to transfer water to the pads, eliminating the need for reservoir water, float valve, pump and overflow pipe. The cycle of the timing means may be varied dependent on moisture or temperature conditions sensed in the pad.

15 Claims, 3 Drawing Sheets

NON-CIRCULATING WATER SYSTEM FOR EVAPORATIVE COOLERS

BACKGROUND—FIELD OF INVENTION

This invention relates to evaporate air conditioners, specifially, to the water circulation used in the evaporation process.

BACKGROUND—DESCRIPTION OF PRIOR ART

The evaporative cooler is the most common means of cooling residential and commercial space in arid and semi-arid regions. Evaporative coolers are relatively inexpensive to purchase and use substantially less energy to operate in comparison to compressor operated refrigeration units.

In general, most evaporative coolers include a housing containing a blower that draws air through one or more pads mounted on the side of the housing. The base or floor of the housing is used as a reservoir for water needed in the cooling process. A pump distributes the water from the reservoir to the top of the pads through a network of tubing and channels. The water then trickles down through the pads where it is absorbed. Air moving through the moist pads causes evaporation which cools the air. The cool air is then directed to the space needing to be cooled. The excess water from the pads returns to the reservoir and the process starts again.

As the cooling process continues, mineral deposits will build up or accumulate in the water due to evaporation. These mineral deposits in the water are corrosive and are the major contributing factor causing premature failure of evaporative cooler components. Cleaning, adjusting or replacement of cooler parts are common occurrences.

Therefore, inventors have created many different types of evaporative coolers and devices designed to correct these problems caused by circulating the water. Most of these inventions have addressed the problems caused by circulating the water but have not addressed the cause itself.

U.S. Pat. No. 2,184,643 to Evleth shows a control system used in a color without a circulating system. It uses a motor to activate a damper and control system. The control system uses a temperature responsive means in conjunction with a humidity responsive means to control a spray of water. Eliminator plates are used for removing particles of moisture from the air instead of pads which hold the moisture particles. The temperature responsive means is located in the space being cooled; thus when the spray is activated, it would continue until the temperature objective was met without regard to the amount of water being discharged. If the temperature objective is never met the spray would continue until the humidity responsive device would over-ride the temperature responsive device and deactivate the spray.

Evleth's control system and the one used in the present invention operate in two different modes or have two different objectives. The objective of Evleth's control system is to provide water for cooling until a temperature or humidity is achieved regardless of the amount of water being discharged. The objective of the present invention's control system is to provide only the water needed for cooling, therefore eliminating excessive water discharge.

OBJECTS AND ADVANTAGES

Accordingly, this invention provides a simple means to eliminate the circulation of water used in conventional evaporative coolers. Several objects and advantages of the present invention are:

(a) To provide an evaporative cooler that does not circulate the water.
(b) To provide an evaporative cooler that does not need a reservoir of water.
(c) To provide an evaporative cooler that does not need a float valve.
(d) To provide an evaporative cooler that does not need a pump.
(e) To provie an evaporative cooler that uses domestic water line pressure as a means to move water to the pads.
(f) To provide an evaporative cooler that increases pad life.
(g) To provide an evaporative cooler that does not need an overflow pipe.
(h) To provide an evaporative cooler that operates cleaner and requires less maintenance.
(i) To provide a means to wet the pads without excessive water discharge.

DRAWING FIGURES

Figure 2:
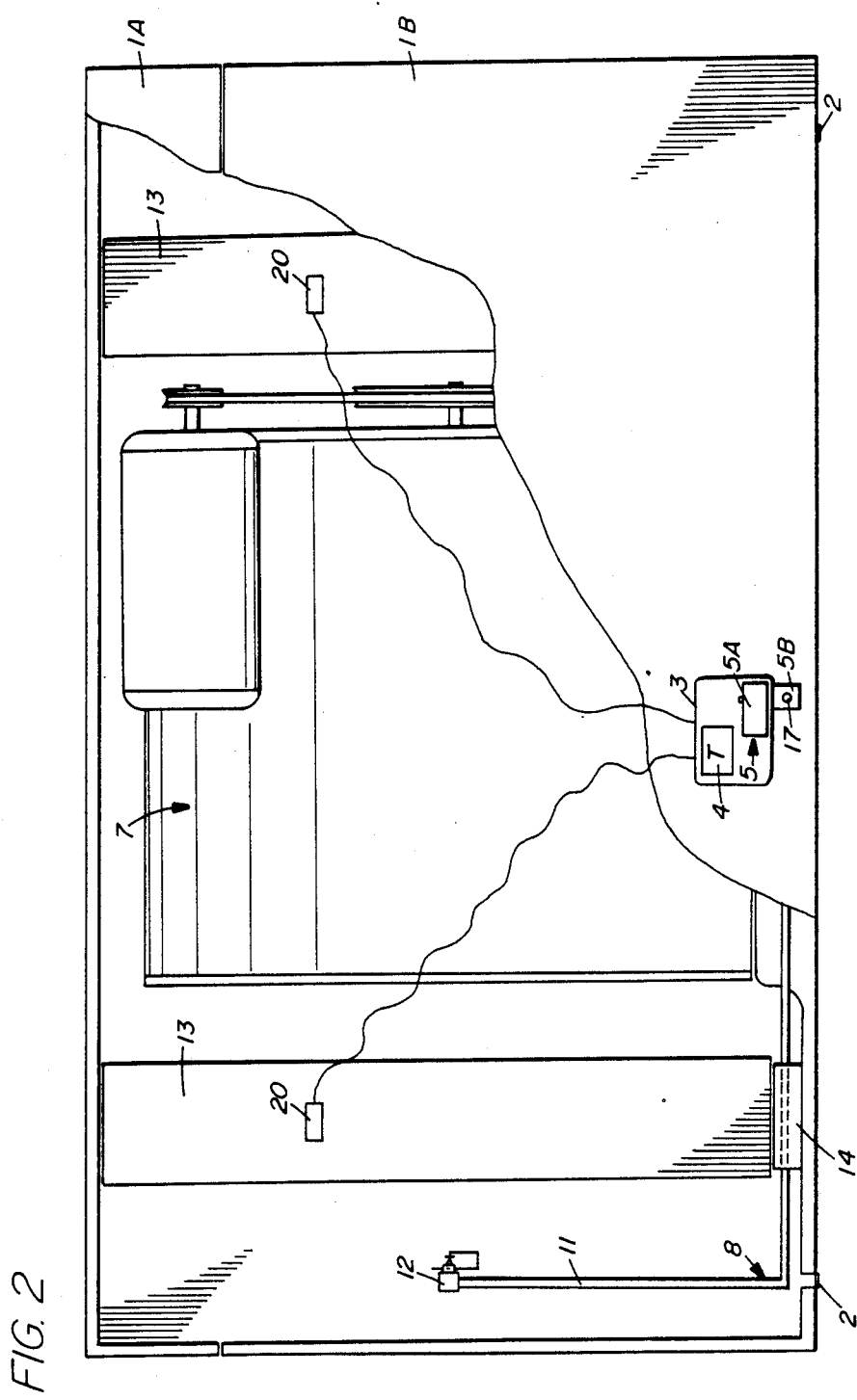
Figure 3:
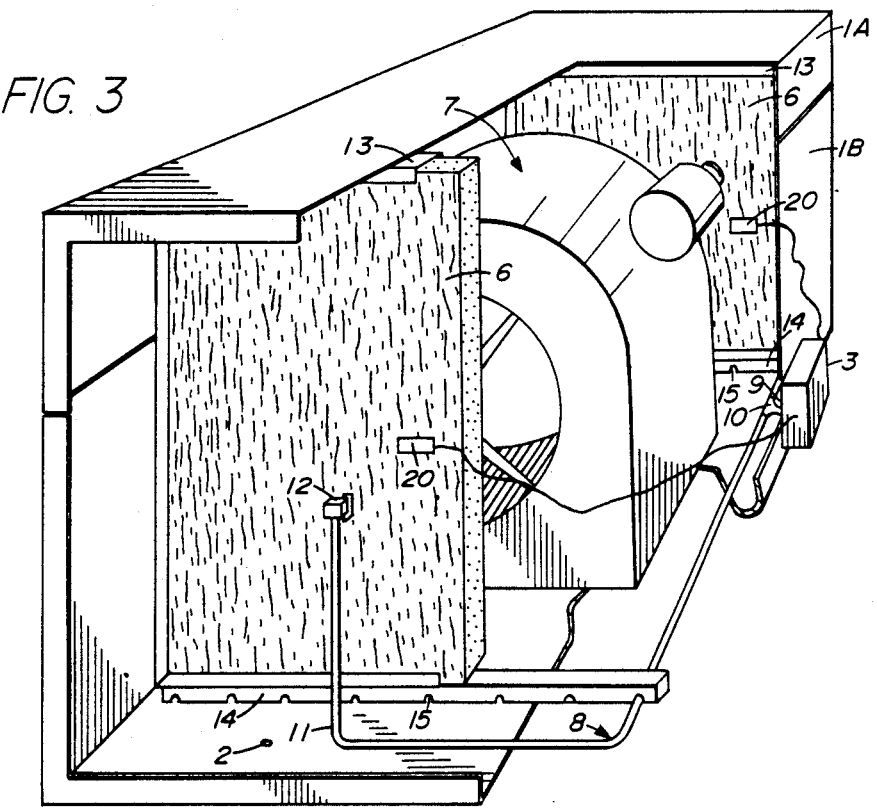
Figure 4:
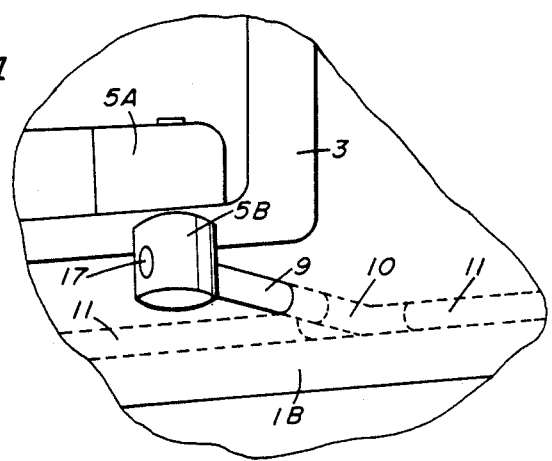

FIG. 1. is a top view looking down with the top removed.
FIG. 2. is a side view with a section broken away.
FIG. 3 is a perspective view with a section cut away.
FIG. 4. is an enlarged view showing the connection of solenoid valve to the water distribution system.

DESCRIPTION OF INVENTION

A cooler using a non-circulating system would use a timing means 4 and solenoid valve 5 to apply measured amounts of water to the evaporation media or pads 6. A draining means 2 would also be needed for discharging water not used in the evaporation process. FIG. 1, 2, 3, 4 show an evaporative cooler using a non-circulating system.

FIG. 1 shows a top view looking down with the top removed. It shows a blower and motor assembly 7 mounted in the center of the housing bottom 1B. On either side of the blower and motor assembly 7 you will find a pad frame 13. In front of the pad frame 13 you will find a spray nozzle 12 which is connected to tube 11. This tube 11 connects to a tee 10. A tee pipe 9 is used to connect valve 5B to tee 10. The water distribution system 8 would include parts 9, 10, 11, 12. A drain means 2 is located in the housing bottom 1B.

FIG. 2 shows a side view of the cooler with the control box 3 opened. A section of the housing bottom 1B and housing top 1A, has been broken away to show internal parts. Blower and motor assembly 7 is in the center of the housing. Pad frame 13 is sitting on a spacer 14. The control box 3 contains the timing means 4. The solenoid 5A is also mounted inside box 3, and the valve 5B extends through the bottom of the box 3. A domestic water line inlet 17 is found in valve 5B. A drain means 2 is located in the housing bottom 1B.

FIG. 3 shows a perspective view with a section cut out. It includes housing bottom 1B and housing top 1A with blower and motor assembly 7 in the center. Pad 6 is mounted inside of pad frame 13. Pad frame 13 sits on spacer 14 which has drain grooves 15. Control box 3 is attached to housing bottom 1B. Tee pipe 9 connects valve 5B and tee 10. Tubes 11 connect tee 10 to spray nozzle 12.

FIG. 4 shows the valve 5B extending through the bottom of control box 3 and the solenoid 5A inside the box. A domestic water line inlet 17 is located in the front of valve 5B. On the other side of the valve 5B a tee pipe 9 connects the valve 5B to the tee 10. The tee pipe is shown going through the housing bottom 1B and connecting to the tee 10 inside.

DESCRIPTION OF OPERATION

An evaporative cooler using a non-circulating system would include a draining means 2 in the housing 1B. A timing means 4 is used to control a solenoid valve 5. The solenoid-valve 5 is connected directly to a domestic water line at the domestic water line inlet 17. The solenoid valve 5 is used to control the flow of this water going to the water distribution system 8 which wets the pads 6. A pad frame 13 supports the pad 6 and sits on a spacer 14. The spacer 14 has drain grooves 15 which allows water to pass under the pad frame 13. The pad 6 holds the water needed in the evaporation process. A blower and motor assembly 7 draws air through the pad 6 which causes it to cool due to the evaporation process. The cooled air is then moved to the space needing to be cooled.

When the evaporative cooler is off, the blower and motor assembly 7 is inactive, the timing means 4 is in the off state, the solenoid-valve 5 is closed and all water has been drained from the housing 1. When the cooler is turned on the blower and motor assembly 7 become active, the timing means 4 moves to the on state and opens the solenoid valve 5. Pressure provided by the domestic water line moves the water through the solenoid valve 5B and water distribution system 8. The spray nozzle 12 produces a mist that wets the pad 6. The blower and motor assembly 7 draws air through the pad 6 and the evaporation process begins cooling the air.

The water will continue to wet the pad 6 for a predetermined duration or on cycle. This on cycle would continue until the pad 6 is at the saturation point. At the saturation point pad 6 would tend to hold the water and have minimal water run off, whereas any water applied to pad 6 over the saturation point would run off. At the end of this on cycle the timing means 4 cycles to the off state and the solenoid valve 5 closes stopping the flow of water to the pad 6. The timing means 4 will remain in this off state for a predetermined duration or off cycle. Air passing through the wet pad 6 evaporates some of the water and at the end of the off cycle the pad 6 is moist, but no longer at the saturation point. The timing means 4 then cycles to the on state and the cycle starts over. This cycling will continue until the evaporative cooler is turned off. When the evaporative cooler is turned off, the blower and motor 7 becomes inactive, the timing means 4 goes to the off state, the solenoid-valve 5 closes, and any excess water not used in the evaporation process will flow out the drain means 1.

SUMMARY, RAMIFICATIONS, AND SCOPE

Accordingly, the reader will see that measured amounts of water applied to the pad and given measured amounts of time for evaporation will have measured amounts of water to discharge. These factors can be arranged to produce an efficient, inexpensive, reliable cooler with minimal water drainage. The water not used in the evaporation process serves to clean the pads by flushing away mineral deposits left on the pad from previous applications of water. The amount of water discharged is comparable to that being discharged from most conventional coolers using a bleed tee or bleed valve, but with advantages described above. The non-circulating water system also has these advantages in that it does not require a reservoir of water;
  it does not require a float valve;
  it does not require a pump;
  it does not require an overflow pipe;
  it uses domestic water line pressure to move the water;
  it increases pad life;
  it operates cleaner and requires less maintenance.

Although the description above contains many specificities, these should not be construed as limiting the scope of the invention but merely providing illustrations of some of the embodiments of this invention. For example, the timing means could be designed to have on and off cycles that would match a certain size evaporative cooler or these cycles could be varied to fit different size coolers. Another design in the timing means could use a moisture or temperature sensing device 20 that could be mounted in the pad. This advice would activate the timing means depending on moisture content in the pad and it would also vary the time between the cycles due to the outside humidity. That is, more cycling on dry days and less cycling on wet humid days. Another device might use moisture or air temperature to activate the timing means. Different types of valve means could be used as well as water distribution systems, housings, etc.

Thus the scope of the invention should be determined by the appended claims and their legal equivalents, rather than by the examples given.

What I claim is:

1. A gas treating system for conditioning a gas stream by evaporation of a non-circulating evaporative liquid into a gas stream, comprising:
   (a) a housing forming a duct adapted to conduct said gas stream through said housing;
   (b) a panel of flow-through evaporative media secured across said duct;
   (c) blower means for moving said gas stream through said panel;
   (d) liquid dispersal means for conducting said evaporative liquid onto said panel, where said evaporative liquid evaporates into said gas stream as said gas stream flows through said panel;
   (e) non-circulating liquid supply means connected to said liquid dispersal means adapted to conduct a metered amount of said evaporative liquid to said dispersal means;
   (f) sensor means located at said panel for measuring a preselected moisture or temperature condition of said panel, said sensor means being operatively connected with said liquid supply means to selectively control the flow of said evaporative liquid onto said panel through said dispersal means in order to maintain said condition in said panel at a desired magnitude; and
   (g) draining means for allowing any excess of said evaporative liquid which leaves said panel without having been evaporated to drain.

2. The system as in claim 1 wherein said evaporative liquid is water and said gas stream is air.

3. The system as in claim 2 wherein said non-circulating water supply means further comprises:
(i) a source of supply for said water;
(ii) a valve for regulating the flow of said water;
(iii) a nozzle for applying said water onto said panel; and
(iv) tubing means for conducting said water from said valve to said nozzle.

4. The system as in claim 2 wherein said preselected condition is sensed and controlled so as to result in the evaporation of essentially all of said water in said panel.

5. The system as in claim 4 wherein said preselected condition of said panel is the moisture of said panel.

6. The system as in claim 4 wherein said preselected condition of said panel is the temperature of said panel.

7. The system as in claim 4 wherein said selective control of said flow of said water is done continuously.

8. The system as in claim 4 wherein said selective control of said flow of said water is done intermittently.

9. A process for conditioning a gas stream by evaporation of a non-circulating evaporative liquid into a gas stream, comprising the steps of:
(a) moving said gas stream through a duct across which a panel of flow-through evaporative media is mounted;
(b) sensing at said panel a preselected moisture or temperature condition of said panel;
(c) dispersing said non-circulating evaporative liquid onto said panel, where said liquid is evaporated into said gas stream;
(d) controlling the dispersal of said evaporative liquid onto said panel based on said sensing of said preselected condition of said panel, in order to maintain said condition at a desired magnitude; and
(e) draining any excess of said non-circulating evaporative liquid leaving said panel without having been evaporated.

10. The process as in claim 9 wherein said evaporative liquid is water and said gas stream is air.

11. The process as in claim 10 wherein said sensing and controlling is carried out so as to result in the evaporation of essentially all of said water in said panel.

12. The process as in claim 10 wherein said preselected condition of said panel is the moisture of said panel.

13. The process as in claim 10 wherein said preselected condition of said panel is the temperature of said panel.

14. The process as in claim 10 wherein said selective control of said flow of said water is done continuously.

15. The process as in claim 10 wherein said selective control of said flow of said water is done intermittently.

* * * * *